United States Patent [19]
Munter et al.

[11] Patent Number: 5,272,696
[45] Date of Patent: Dec. 21, 1993

[54] ATM PLANE MERGING FILTER FOR ATM SWITCHES AND THE METHOD THEREOF

[75] Inventors: Ernst A. Munter; Barry B. Hagglund, both of Kanata, Canada

[73] Assignee: Northern Telecom Limited, Montreal, Canada

[21] Appl. No.: 824,422

[22] Filed: Jan. 23, 1992

[51] Int. Cl.⁵ .................................. H04Q 11/04
[52] U.S. Cl. ........................... 370/60; 370/94.1
[58] Field of Search ............... 370/60, 94.1, 62, 58.1, 370/54, 94.3, 13, 60.1, 112, 91, 58.2

[56] References Cited

U.S. PATENT DOCUMENTS

| | | | |
|---|---|---|---|
| 4,858,224 | 8/1989 | Nakano et al. | 370/13 |
| 5,072,440 | 12/1991 | Isono et al. | 370/60 |
| 5,138,612 | 8/1992 | Keller et al. | 370/60 |

FOREIGN PATENT DOCUMENTS

| | | |
|---|---|---|
| 0384936 | 9/1990 | European Pat. Off. |
| 2236930 | 4/1991 | United Kingdom |

OTHER PUBLICATIONS

Fisher, D. G. et al., "A Flexible Network Architecture for the Introduction of ATM", May 1990, International Switching Symposium 1990 vol. 2, pp. 35-44.
"The DMS-100 Distributed Control System", Bourne et al., Telesis, No. 4, 1980, pp. 6-12.

*Primary Examiner*—Douglas W. Olms
*Assistant Examiner*—Shick Hom
*Attorney, Agent, or Firm*—Yoshiharu Toyooka

[57] ABSTRACT

Many telecommunication switches operate in dual plane mode for better reliability and maintainability. For ATM switches, it has been difficult to merge cells emerging from two identical planes because of the non-synchronous nature of transmission. An ATM plane merging filter is disclosed. The filter contains memory to store the first of a pair of identical cells under control of filter control means. The filter control means monitors the headers of the cells and sends an enabling signal to the memory for cell storage when no identical cell is in storage.

7 Claims, 2 Drawing Sheets

ATM PLANE MERGING FILTER FOR ATM SWITCHES AND THE METHOD THEREOF

FIELD OF THE INVENTION

The present invention relates generally to an ATM switching network and in particular it is directed to such an ATM switching network that operates in the dual plane operation for better reliability and maintainability. More specifically, the present invention is concerned with an ATM plane merging filter which manages the merging of ATM cells emerging from the two identical planes.

BACKGROUND OF THE INVENTION

As telephone switching systems are required to work non-stop, 24 hours a day, they must be made of the most reliable component arranged in the most efficient manner possible. But the use of highly reliable components alone is not enough to guarantee that breakdowns will not occur. Various ways of achieving the high reliability and maintainability of telecommunication switching systems have been in existence. These are the dual synchronous matched scheme, dual load sharing scheme, triplicated system, multi-computer hierarchy system, multi-computer democracy system, and multi-processor system, to name a few. Among these schemes, the dual synchronous matched scheme (dual plane operation) has been proven very successful.

While this scheme is fairly routine in TDM switching, it has not been adapted for message switching or computing except in specialized cases. The reason for this is primarily the difficulty of macroscopic (message) synchronisation between the duplicated systems. The load-sharing/standby approach in these systems is also justified on the basis of end-to-end recovery protocols.

The ATM switching operation possesses attributes of both synchronous and asynchronous behaviour. The generally synchronous nature of ATM transport should blend into the dual plane operation scheme nicely. What must still be dealt with, however, is the asynchronous behaviour introduced by queues in the switches and multiplexers.

In TDM switches, disagreement between the planes can be dealt with channel by channel. The faulty channel generally does not affect other channels, their order or contents, or their connections because every channel is attached to a hardware timeslot. This is not the case for ATM switches. Since cells are not attached to timeslots but freely compete through arbitration mechanisms for available timeslots, any address change or other interference with the arbitration mechanism, for example as a result of a bit error, can change the order of cells. Consequently, a receiving peripheral cannot expect to receive matching pairs of cells from the two planes in the case of such errors. Yet the purpose of the dual plane operation is to allow peripherals to select one stream of cells from the signals received from each plane, preferably cell by cell.

A detailed description of the typical dual plane operation in the conventional digital switching environment is found in an article entitled "The DMS-100 Distributed Control System" by Bourne et al in Telesis, No. 4, 1980, pp 6-12.

The present invention addresses difficulties associated with the above-mentioned dual plane operation of ATM switches and proposes certain solutions.

OBJECTS OF THE INVENTION

It is therefore an object of the present invention to provide an ATM plane merging filter to be used in an ATM switching network operating in dual plane operation.

It is another object of the present invention to provide an ATM plane merging filter having means for monitoring ATM cells from two identical planes and storing only one of the identical ATM cells in a pair for later delivery.

It is yet another object of the present invention to provide a method of merging ATM cells emerging from two identical switch matrices in an ATM switching network operating in the dual plane operation.

SUMMARY OF THE PRESENT INVENTION

Briefly stated, the present invention relates to an ATM switching network for switching ATM cells whose switch header contains at least source, destination, sequence fields or the like having two identical switch matrices for the dual plane operation. The invention is directed to an ATM plane merging filter to be used in the ATM switching network. The merging filter comprises multiplexing means for multiplexing in interleaving fashion the ATM cells emerging from the two identical switch matrices onto a single cell bus. A header reading means is provided in the filter for reading the source and sequence fields from the switch header of each ATM cell being carried on the cell bus and sending the same to a filter control means. The filter control means includes memory means for storing the source and sequence fields in its memory means for reference. The filter control means also sends simultaneously an enabling signal to a cell FIFO only when the memory means does not already have a reference to an equally identified cell. The cell FIFO is connected to the cell bus for storing the corresponding ATM cell when enabled by the enabling signal. A peripheral link is attached to the cell FIFO for delivering each of the cells stored in the cell FIFO to an appropriate peripheral terminal.

According to another aspect, the present invention is directed to a method of merging ATM cells emerging from two identical switch matrices in an ATM switching network operating in the dual plane operation. The switch header of the ATM cells contains at least source, destination, sequence fields or the like. The method comprises steps of multiplexing in interleaving fashion the ATM cells from the two identical switch matrices onto a single cell bus and reading the source and sequence fields from the switch header of each ATM cell being carried on the cell bus. The method further includes steps of storing the source and sequence fields in memory means for reference and sending an enabling signal to a cell FIFO connected to the cell bus only when the memory means does not already have a reference to an equally identified cell. The method still includes steps of storing the corresponding ATM cell in the cell FIFO when the cell FIFO is enabled by the enabling signal and delivers each of the corresponding ATM cells stored in the cell FIFO to an appropriate peripheral terminal through a peripheral link connected to the cell FIFO.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS OF THE INVENTION

Figure 1:
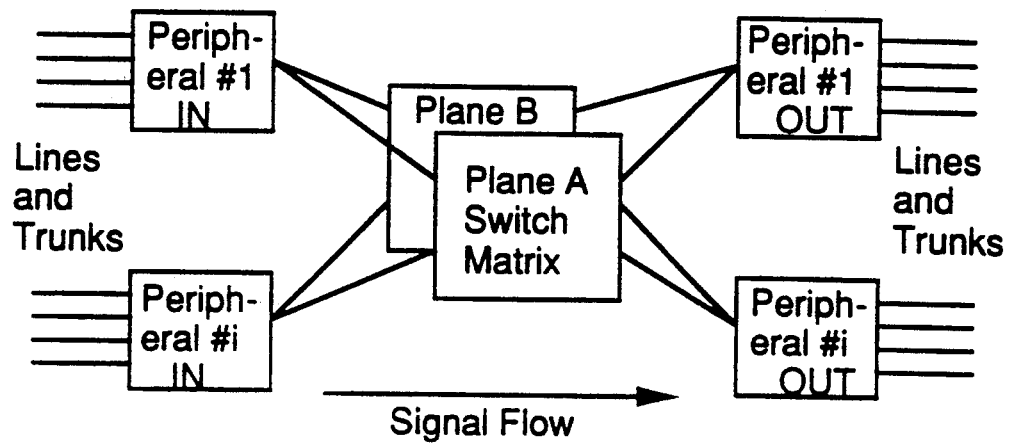
FIG. 1 is a schematic block diagram showing the concept of the dual plane operation of a prior art switch.

Referring to FIG. 1, there is shown schematically a switch which is designed to operate in the dual synchronous matched mode. All the channelized TDM data streams from peripherals 1 . . . i are sent through both switching matrix planes A and B. Each of the switching matrices switches the channels identically. The match circuit in the receiving peripherals monitors the two data streams and selects one of them. The problem in the case of a mismatch is to decide which one is in good condition. The decision depends on the validity of the data in hand (parity check, etc.).

Traditionally, digital transmission facilities had error rates far in excess of the bit error rates expected to occur in switching equipment. But error rates on fiber transmission systems are very low. This has already resulted in a new, much more stringent, error rate objective being proposed for DSO switches. In broadband and ATM switches, the total bit throughput will be much higher, and, given the same error rate, bit errors become more readily measurable, both by the user and the telephone companies. Furthermore, ATM operation runs the risk of losing entire cells, effectively multiplying the error rate. This standpoint would make it imperative that an ATM switch is not only at least as good as a TDM switch, but it must also possess equally good or better diagnostic and fault detection capabilities in order to be able to maintain error free operation over life.

The simplest solution would be to designate switching planes as active and standby. This, however, not only reduces reliability with respect to multiple failures, it also reduces the ability to detect malfunctioning of the standby plane and would create a requirement to periodically switch planes, a function which would have to be performed without introducing errors during the switchover. The switchover strategy with hot/standby planes could rely on the planes being normally in sync (which they usually might be, given identical logic, common starting point, common clock sources and no recent error events), and wait for sync if necessary.

A more general alternative is to have a re-synchronising circuit which reduces the two cell streams (from the two planes) to a single stream without missing any cells or duplicating any. Such a circuit could be made to handle plane-merging continuously, with all the benefits of continuous hot operation of both planes. This principle can be expressed quite simply. The transmitting peripheral sends out identical cells over both planes. The receiving peripheral receives from both planes, keeps the first copy of each cell and discards its duplicate. In addition, it is possible (and desirable for fault detection) to watch out for and register the absence of duplicates.

Figure 2:
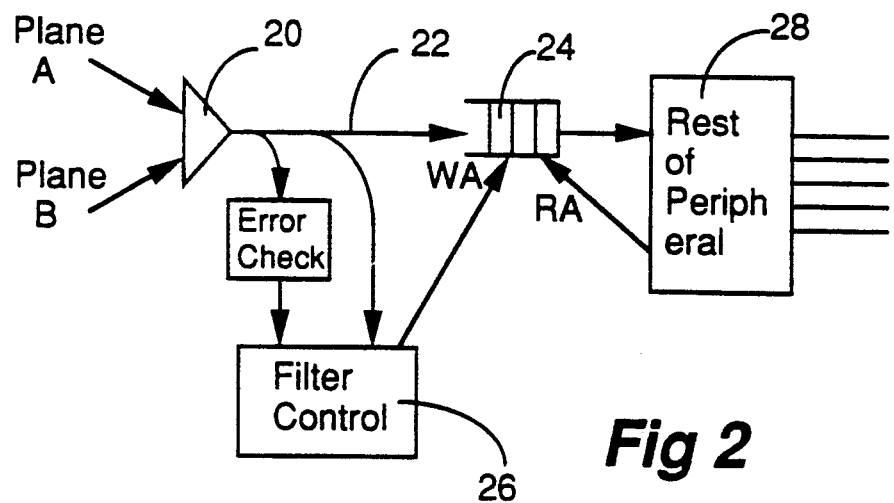
FIG. 2 is schematic diagram illustrating the concept of the present invention.

FIG. 2 illustrates the basic configuration of the invention which embodies the principle discussed above. In the Figure, cells from both switch matrix planes A and B are multiplexed at a multiplexer 20 into an interleaved cell bus 22 and sent to a cell FIFO 24 for storage. The switch headers are also diverted from the bus to a filter control circuit 26 for processing. The filter control circuit 26 processes the header of each cell for filtering action. Although cells from both planes are sent to a cell FIFO 24 through the bus 22, only one of the two copies (usually the first arrival) is stored in the FIFO as a result of the processing of the header at the filter control circuit 26. Cells stored in the cell FIFO 24 are read by a peripheral 28 which sends cells to appropriate outputs. Writing to the cell FIFO is under control of the filter control circuit which sends a write-enabling signal WA and, as a result, the cell FIFO does not store duplicate copies. Reading from the cell FIFO is under control of the peripheral by a signal RA and proceeds at the nominal cell rate: if the cell FIFO is not empty, then the next cell is taken, otherwise an idle cell is manufactured. In other words, idle cells from the switching matrix are actually not passed on through the FIFO, but rather new idle cells are generated after the FIFO.

To meet the international standards, a switched ATM cell is at least 53 bytes. In a sample design, switched cells are expanded to a length of 64 bytes, to allow for additional fields used in the switch operation. Thus 9 bytes are set aside for the added switch header, 2 bytes for cell error checking, and the remaining bytes are for the standard 53 byte ATM cell which in itself includes a 5 byte header and 48 byte payload. The present inventor's copending U.S. patent application Ser. No. 07/638,872 filed on Jan. 11, 1991, describes the structure of ATM cells in a little more detail. The switch header must support routing through the switch matrix, thus requiring a physical DESTINATION id. In addition, the present invention requires specific information to be carried in the switch headers. For example, it needs unique identification of cells so that the duplicates can be checked against each other. This is done by including a (physical) SOURCE id plus a source-specific SEQUENCE number. It should be noted that in places of the source and destination fields, some other fields such as connection number etc. which indirectly identify source and destination can be used. The range of the sequence number must be sufficient to cover the foreseeable switch delay. A bit error indication is required to allow discarding of errored cells. It can be argued that user data errors will be protected (or tolerated) elsewhere, and such cells should not be discarded in the switch. Nevertheless, if two copies of the same cell are sent between peripherals over the two switching planes and one of them receives a bit error in the user data field while the other copy is good, it would be desirable to have means of (a) detecting that something went wrong and (b) sending the good cell to the user and not the bad one. This means that the switched ATM cell, which extends from switch peripheral to switch peripheral, should have an ERROR CHECK which covers all data, not only the switch header. In the embodiments of the present invention, of 9 bytes of the switch header, 2 bytes each are used for physical SOURCE and DESTINATION fields and 1 byte for SEQUENCE number. There is a 6 bit error check in the switch header which covers only the header, to prevent misrouting of cells in the switch matrix. A 2 byte ERROR CHECK is provided at the end of the switched ATM cell. It covers the 53 bytes of the standard ATM cell, including the user payload. Any cell that fails either the header or data error check is discarded by the filter circuit, without further analysis.

Figure 3:
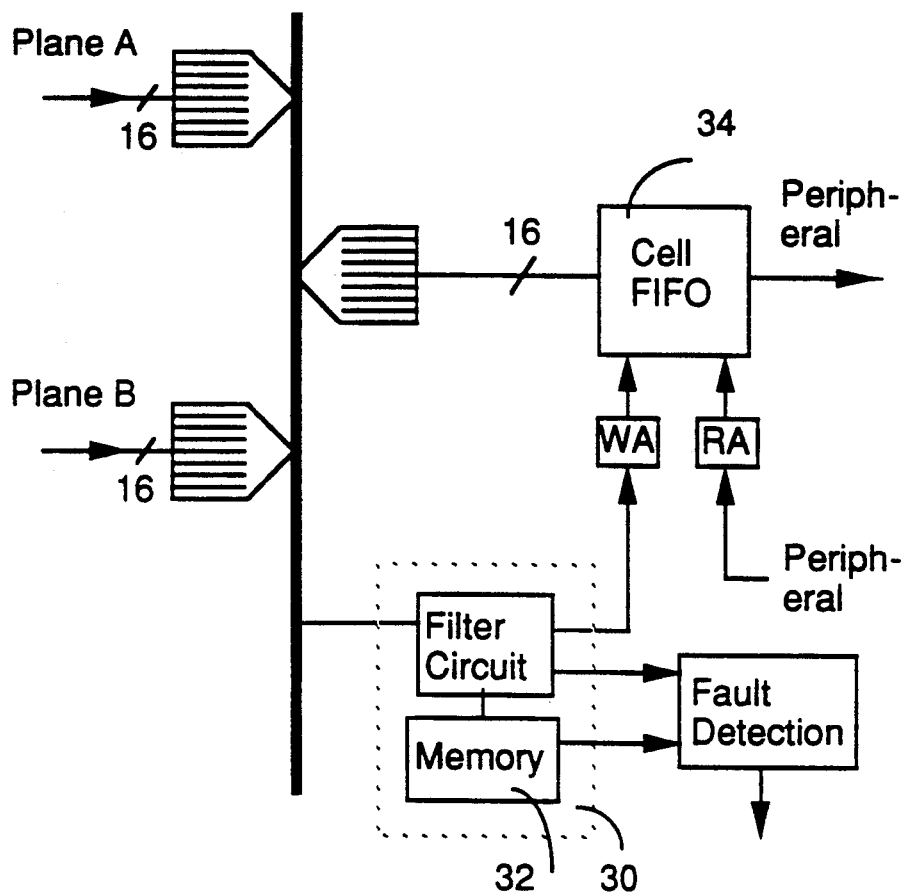
FIG. 3 is a schematic diagram of the ATM plane merging filter according to one embodiment of the present invention.

FIG. 3 shows schematically an ATM plane merging filter of an ATM switch according to one embodiment of the present invention. In this embodiment, the filter control circuit 30 contains a memory 32 made of RAM having enough memory locations for all possible sources, each location being one byte wide to store the last sequence number of each received cell. Every time the sequence number of a cell is stored in the RAM, the filter control circuit sends a write enabling signal WA to the cell FIFO memory 34 so that the entire cell is written in the cell FIFO. When a duplicate copy arrives at the filter control circuit 30, it will find the location in the RAM occupied by the identical sequence number. The filter control circuit 30 does not send a write enabling signal to the cell FIFO and thus the duplicate copy is not stored. The peripheral output circuit sends a read enable signal RA to the cell FIFO at appropriate timeslots to retrieve the cells stored in the cell FIFO.

According to another embodiment of the invention, the RAM shown in FIG. 3 is replaced by a CAM (Content Addressable Memory). A CAM is a memory device with the ability to store and retrieve data words by address like an ordinary RAM but, in addition, it has the ability to compare any dataword presented to it with all of the CAM contents at once, and report the address of the match if any. The CAM in this embodiment is used to store the source and sequence fields of each arriving header and its plane origin bit, but only if the header is not found in the CAM already. Simultaneously, storage in the cell FIFO is enabled only if no CAM match is found. This ensures that the first of a duplicated pair of cells enters the cell FIFO and the second is rejected, assuming both were received without error.

In the case of a normally synchronous switch matrix, both the A-plane cell and B-plane cell will arrive practically simultaneously. The order of multiplexing will determine whether A or B cells get stored. Of course, this order does not matter when A and B cells are identical. When arrivals are not synchronous, either the A or B cell produces the first instance of each individual cell pair, and the circuit will always pass on the earlier one, thus minimizing average delay. The CAM or RAM holds the identifier and waits for the second copy to arrive and be discarded. The associated CAM or RAM location is then freed. Idle cells are not stored in either the cell FIFO, the RAM, or the CAM.

The purpose of the cell FIFO is to smooth out instantaneous imbalances in cell arrivals from the two planes. On the average, even at 100% occupancy, the rate of cells accepted from planes A and B, after removal of duplicate copies, equals the rate of delivery to the peripheral. But for short periods, assuming the two planes are not in sync, it is possible that valid new cells arrive from both planes every cycle, with respective duplicate copies arriving later by a certain amount of delay between the planes set by the design called the plane delay skew. In the worst case, 100% occupancy, and planes transmitting opposite batches of cells, the cell FIFO must absorb 2N cells while delivering only N to the peripheral. N is the maximum skew in terms of cell cycle. A conservative design would allow for a FIFO capacity of N cells.

In the embodiment where a CAM is used, it is expected that items in the CAM will not remain for very long. In fact it should be detected if an item has remained too long since this indicates a problem with the opposite plane, that is to say the matching cell has not arrived. It is therefore advantageous to operate the CAM in a cylic manner, increasing addresses with each storage request. At the time a location needs to be written to again, it should be free since the previous occupant should have been matched and cleared earlier. If there is a collision, and a storage request encounters a busy location, this indicates that a matching second cell has not yet been received. The contents in that location (opposite plane id) indicate the faulty plane and potentially the source. In this event, the location should be overwritten regardless, and an error counter incremented. If the missing cell should show up too late it will not be recognised as a duplicate any longer, and would be delivered to the user. This must be avoided, and the CAM capacity must be sufficient (NxFIFO capacity) to accommodate the longest expected differential delay between the planes.

A safe strategy might be, upon the first indication of trouble (e.g. CAM collision) to lock out the faulty plane for a designated fixed period until error free operation is re-established. This would allow a reduction in the size of CAM required.

Under low traffic conditions, the CAM could take an order of magnitude longer to complete a cycle than under high traffic. This would mean that the error detection time increases. This is not necessarily bad but can be avoided simply by advancing the CAM address counter continuously, even with the arrival of idle cells.

While the foregoing description relates to the embodiments which use two identical planes, it should be noted that they do not have to be identical or synchronised at all. In fact, they do not have to be separate planes but could just be two sets of ports on one switch. Generally, however, it would be less costly to have two smaller networks than one twice the size.

It is also possible that the sequence numbers could also be source and destination specific. This would allow the detection of certain double faults since the occurrence of consecutive sequence numbers for each source/destination combination could be tracked, at the expense of more memory. Without source specific numbering only, there is no guarantee that cells from the same source arriving at a given destination are consecutively numbered.

It may be noted that more complex filter and FIFO circuits, perhaps with more than one FIFO buffer, cover more multiple error cases, for example, where errors occur simultaneously in both switch planes. The embodiment described here represents an engineering compromise between a simple circuit to meet the objective of error free cell delivery during most likely fault situations, and more complex solutions which could allow for even higher error protection and detection capability.

We claim:

1. In an ATM switching network for switching ATM cells whose switch header contains at least source, destination, sequence fields or the like, having two identical switch matrices for the dual plane operation, an ATM plane merging filter comprising:
   multiplexing means for multiplexing in interleaving fashion said ATM cells emerging from said two identical switch matrices onto a cell bus;
   header reading means for reading the source and sequence fields from said switch header of each ATM cell being carried on said cell bus and sending the same to filter control means;

said filter control means including memory means for storing data indicating said source and sequence fields in said memory means for reference and for simultaneously sending an enabling signal to a cell FIFO, only when said memory means does not already have a reference to an equally identified cell;

said cell FIFO connected to said cell bus for storing the equally identified cell when enabled by said enabling signal; and a peripheral link attached to said cell FIFO for delivering said equally identified cell stored in said cell FIFO to an appropriate peripheral terminal.

2. An ATM plane merging filter according to claim 1, wherein said filter control means includes content addressable memory means for storing said source and sequence fields in said memory means only when the identical source and sequence fields are not found in said memory means.

3. An ATM plane merging filter according to claim 1, wherein said filter control means includes RAM means having enough memory locations, each of which is assigned to each possible source field, for storing a sequence field at each memory location, and sends said enabling signal to said cell FIFO only when the identical number in said sequence field is not found in said memory location.

4. An ATM plane merging filter according to claim 2, wherein said content addressable memory means has addressing means for a cyclic operation.

5. In an ATM switching network for switching ATM cells whose switch header contains at least source, destination, sequence fields or the like, having two identical switch matrices for the dual plane operation, a method of merging ATM cells from said two identical switch matrices comprising steps of:

multiplexing in the interleaving fashion said ATM cells emerging from said two identical switch matrices onto a cell bus;

reading the source and sequence fields from said switch header of each ATM cell being carried on said cell bus;

storing said source and sequence fields in memory means for reference;

sending an enabling signal to a cell FIFO connected to said cell bus only when said memory means does not already have a reference to an equally identified cell;

storing the equally identified cell in said cell FIFO when said cell FIFO is enabled by said enabling signal; and delivering said equally identified cell stored in said cell FIFO to an appropriate peripheral terminal through a peripheral link connected to said cell FIFO.

6. The method of merging ATM cells according to claim 5, wherein said memory means is a content addressable memory and said step of storing said source and sequence fields comprises a further step of comparing the content of said memory means to determine the presence of identical source and sequence fields.

7. A method of merging ATM cells according to claim 5, wherein said memory means is RAM means having enough memory locations for all the possible source fields, each location being assigned to each source field, and said step of storing said source and sequence fields comprises a step of storing a sequence field at a memory location assigned to a source field, and said step of sending an enabling signal includes a step of sending said enabling signal to said cell FIFO only when the identical number in said sequence field is not found in said memory location.

* * * * *